(12) United States Patent
Paul et al.

(10) Patent No.: US 6,238,772 B1
(45) Date of Patent: May 29, 2001

(54) MINE BRATTICE CLOTH

(75) Inventors: David H. Paul, Oakland, MO (US); Bobby Allen Picker, Jr., Chicago, IL (US); Michael J. Mittler, deceased, late of Chillicothe, OH (US), by Stanley B Dritz, executor

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 09/250,488

(22) Filed: Feb. 16, 1999

Related U.S. Application Data

(60) Provisional application No. 60/075,043, filed on Feb. 18, 1998.

(51) Int. Cl.⁷ ........................................................ B32B 3/10
(52) U.S. Cl. ........................... 428/142; 428/41.7; 428/46; 428/55; 428/78; 428/96; 428/101
(58) Field of Search ............................. 156/245; 428/221, 428/41.7, 43, 46, 47, 55, 56, 78, 96, 101, 120, 141, 142

(56) References Cited

U.S. PATENT DOCUMENTS

| | | | |
|---|---|---|---|
| 2,567,333 | * | 9/1951 | Gogan . |
| 3,551,025 | * | 12/1970 | Bingham et al. . |
| 3,700,305 | * | 10/1972 | Bingham . |
| 3,758,192 | * | 9/1973 | Bingham . |
| 3,810,804 | * | 5/1974 | Rowland . |

* cited by examiner

*Primary Examiner*—Merrick Dixon
(74) *Attorney, Agent, or Firm*—Thompson Coburn LLP; Paul A. Lesko

(57) ABSTRACT

Flame-resistant, retroreflective, transparent, flexible, tear-resistant, mine brattice cloth with plastic-coated, open web fabric and retroreflective strips. Preferred plastic coating is a flame-resistant vinyl polymer plasticized with tri aryl phosphate ester or tetrahalo phthalate ester.

10 Claims, 1 Drawing Sheet

FLAME RESISTANT

FLAME RESISTANT

FIG. 1

MINE BRATTICE CLOTH

This application claims the benefit of priority under 35 U.S.C. §119(e) of U.S. Provisional Application No. 60/075,043 filed Feb. 18, 1998.

Disclosed herein are flame-resistant, transparent, flexible, mine brattice cloths having enhanced visibility from retroreflective areas. Also disclosed are methods of making and using such mine brattice cloths.

BACKGROUND

In many hard rock mining operations it is common practice to employ large flow rates of ventilating air to dilute and remove undesirable or dangerous gases such as carbon oxides and methane. Air flow can be directed and controlled by hanging heavy cloth, e.g. vinyl-coated, fabric known as brattice cloth, throughout a mine. For instance, light weight, plastic-coated, brattice cloth is hung against tunnel surfaces, e.g. ceilings and walls, to reduce frictional air drag. And, heavier weight, plastic-coated brattice cloth is hung across tunnel openings to divert air flow away from certain tunnels or rooms. Such brattice cloth must be flexible, durable and tear-resistant to withstand repeated impact from pedestrian and vehicular traffic passing through an area blocked by a brattice cloth.

One version of brattice cloth comprises vinyl sheets laminated to an open web reinforcement fabric. The reinforcement fabric adds tear strength and toughness to the cloth. In coal mining operations it is desirable to use a flame-resistant, brattice cloth, i.e. a brattice cloth meeting industry or government standards for fire-resistance. High loading of fire-retardant fillers are commonly used to render such plastic-coated, cloth laminates fire-resistant. Such fillers however will make a plastic sheet opaque which creates hazards to people and equipment which may be located in the area behind a brattice cloth. For instance, such people and equipment are susceptible to impact from vehicles passing through a brattice cloth screen. Thus, to avoid such collisions it is desirable to use non-filler fire retardants to provide transparent cloth which allows perception of people and objects behind a transparent cloth.

Transparent cloth, however, does not always permit a determination of what is immediately behind the brattice cloth, for instance, a mine wall behind a wall covering brattice cloth and a dimly lit tunnel behind a brattice cloth tunnel curtain. Thus, transparent brattice cloth leaves open the possibility that a vehicle driver who is intending to pass through a tunnel blocking brattice cloth may accidentally collide with a brattice cloth-lined, tunnel wall. Thus, it would be desirable to employ a reflective device on such transparent, brattice cloth but for the fact that most useful retroreflective devices that could be used in brattice cloth are so highly flammable as top offset the benefits of fire retardants used to reduce the flammability of plastic coatings.

SUMMARY OF THE INVENTION

This invention provides a flexible, transparent, retroreflective, flame-resistant, plastic-coated, open web fabric sheet that is especially useful as a mine brattice cloth. In one aspect of the invention such a sheet comprises outer layers of transparent, flame-resistant vinyl with an inner reinforcement layer of open web fabric and strips of retroreflective material between the vinyl layers.

BRIEF DESCRIPTION OF THE DRAWINGS

FIG. 1 illustrates a font size for a phrase useful in testing the optical transparency of a brattice cloth according to this invention.

DETAILED DESCRIPTION OF PREFERRED EMBODIMENTS

As used herein the term "retroreflective" describes a surface which is capable of reflecting the bulk of the light rays impinging thereon in a substantially parallel path back toward the source. Retroreflective tapes or sheet material useful in the brattice cloth of this invention comprise glass microspheres or cube-cornered microprisms as disclosed in U.S. Pat. Nos. 2,567,333; 3,551,025; 3,700,305; 3,758,192 and 3,810,804. Retroreflective tape comprising embossed acrylic microprisms are commercially available as Stimsonite brand reflective tape. Preferred retroreflective tapes are plastic-coated strips, e.g. about 1 to 3 centimeters wide, with imbedded retroreflective glass microspheres which are commercially available from the Minnesota, Mining and Manufacturing Company (3M) as Scotchlite® brand reflective tape. In preferred embodiments of the invention the plastic coating of the retroreflective strip is compatible with, i.e. bonds to, the plastic material comprising the coating layers of the brattice cloth. In other cases, incompatibility of the plastics is acceptable if the area occupied by the retroreflective strip in the brattice cloth is relatively minor. Such retroreflective tapes are typically highly flammable due to solvents in adhesives and fine metal materials which are used in such tape.

As used herein the term "light weight" refers to a brattice cloth having a surface density of less than 700 grams per square meter (less than 21 ounces per square yard); and "heavy weight" refers to a brattice cloth having a surface density greater than 700 grams per square meter.

As used herein the terms "PVC" and "vinyl" refer to polyvinyl chloride materials typically containing substantial amount of plasticizer, e.g. in the range of 30 to 70 weight percent plasticizer. Medium/high molecular weight PVC means a PVC resin having a relative viscosity in the range of 0.9 to 1.1.

As used herein the term "flame resistance" refers to a brattice cloth that passes the flame resistance requirements of Part 7, Subpart D of Title 30 Code of Federal Regulations or 30 CFR Section 7.24.

The brattice cloth of this invention comprises a laminate of outer layers of plastic sheet and an inner layer of open web reinforcing fabric that provides tear resistance and toughness. The open web is preferably polyester, polypropylene, fiberglass, polyamide or polyaramide scrim of an open weave design that affords high transparency through the fabric. Useful open-webbed, polyester scrim can have a surface density in the range of 35 to 100 grams per square meter. The openness of the fabric can be characterized by the number of open areas per unit length or unit area or the number of threads per unit length. Useful fabric will have an open weave with about 0.5 to 5 thread (or spaces) per centimeter, preferably 0.8 to 3.5 threads per centimeter (2 to 9 threads per inch).

The laminated brattice cloth can be prepared by any of a variety of well known processes for laminated vinyl sheet, e.g. by lamination of heated or plastisol-coated vinyl sheet to an inner fabric layer using the pressure of calendering rolls. Preferably no adhesive is used to bond the vinyl sheets to the fabric layer. Calendering processes are useful for preparing laminated vinyl sheet where the vinyl layers are fused into a unitary sheet with embedded, reinforcing fabric.

To enhance the visibility of the brattice cloth retroreflective strips are embedded between the vinyl layers during the calendering step. The retroreflective strips can be of any width but strips of about 1 to 3 centimeters wide are preferred for providing a visible reflective strip without masking the visibility of the otherwise transparent cloth. The strips themselves can be transparent or in any color. Orange and yellow are preferred colors for enhanced visibility in artificial light. The strips can be retroreflective on one side or preferably on both sides. The reflective surfaces of the strips, e.g. glass microspheres or cubic-faced microprisms are preferably covered with a polymeric material having a refractive index similar to that of the polymeric layer of the cloth. In the case of vinyl layers it is preferable that the retroreflective strip be coated with a polymeric material having an index of refraction of about 1.55 to 1.6. Although the polymeric layer covering the reflective surfaces is preferably vinyl polymer to aid in fusion with the vinyl layers into a unitary sheet, other polymeric material can be used even if fusion to the vinyl is not effective so long as the area of nonfusion is small.

To provide a flame-resistant, transparent, vinyl sheet for lamination PVC material is combined with fire retardant plasticizers which form solutions with polyvinyl chloride. In this regard solid fire retardant materials which impart opaqueness to the vinyl are preferably avoided except in the smallest of amounts which do not adversely detract from the desired transparency. Preferred fire retardant plasticizers which form solutions with vinyl polymer include aryl phosphate esters and halogenated phthalate esters. Halogenated phthalate esters include di-alkyl esters of tetra bromo and tetra chloro phthalic acid, e.g. tetra bromo di-octyl phthalate and tetra chloro di-octyl phthalate. Preferred aryl phosphate esters are tri-aryl phosphate esters such as mixtures of phenyl and p-t-butyl phenyl phosphates, mixtures of phenyl and isopropylated phenyl phosphates, mixtures of phenyl and sec-butyl phenyl phosphates, tri xylyl phosphates, tri tolyl phosphates, phenyl xylyl phosphate and cresyl diphenyl phosphate. An especially preferred triaryl phosphate ester is t-butylphenyl, diphenyl phosphate ester. Other fire retardant plasticizers include halogenated hydrocarbon waxes. Other plasticizers which can be used in moderation to impart desired flexibility include aryl/alkyl phosphate esters such as 2-ethyl hexyl diphenyl phosphate ester, dialkyl adipates and dialkyl phthalates.

Other additives which may be desirable include epoxidized fatty acids such as epoxidized soya oil, fatty acid amide blocking agents such as monostearic amides of erythritol, antioxidants, stabilizers such as barium/calcium soaps, slip agents, lubricants and clear inorganic fillers. The plasticizer and other additives can be compounded into the vinyl polymer by conventional methods and the plasticized vinyl compound can be formed into a sheet conventional means such as extrusion and/or calendering.

Preferred plasticizers and other additives will have an index of refraction matching the index of refraction of the vinyl polymer to afford the highest possible transparency, a preferred triaryl phosphate ester with an index of refraction approximately the same as vinyl polymer is a mixture of phenyl and p-t-butyl phenyl phosphate. In preparing plasticized vinyl formulations for use with the brattice cloth of this invention the following formulation is useful:

| Component | Amount |
| --- | --- |
| PVC Resin | 100 parts |
| triaryl phosphate ester plasticizer | 20–60 parts |
| phthalate ester plasticizer | 0–30 parts |

-continued

| Component | Amount |
| --- | --- |
| chlorinated hydrocarbon plasticizer | 0–30 parts |
| epoxidized soya oil | 0–5 parts |
| antioxidant | 0–2 parts |
| thermal stabilizer | 1–5 parts |
| slip/antiblock agent | 0–1 parts |
| lubricant/metal release agent | 0–1 part |
| toner | 0–1 part |

The following specific examples are presented to more particularly illustrate the invention and should not be construed as being limitations on the scope and spirit of the invention.

EXAMPLE 1

This example illustrates the preparation of one embodiment of a transparent, flexible, flame-resistant vinyl laminate which is useful as a mine brattice cloth Medium/high molecular weight, virgin PVC resin with an inherent viscosity of 0.9–1.1 was compounded with 39 parts per hundred (pph) of Santicizer 154 brand triaryl phosphate ester (from Solutia, Inc., St. Louis, Mo.), 10.5 pph of Palatinol 711 brand phthalate ester plasticizer (from BASF), 11 pph of Chlorowax 500 AO brand chlorinated hydrocarbon plasticizer (from OxyChem Corp), 3.25 pph Baerostab UBZ 7951 brand heat stabilizer (from Baerlocher USA), 2.5 pph epoxidized soya oil, 0.5 pph of Weston 618-F brand stabilizer (from General Electric Specialty Chemicals), 0.5 pph of Paraloid K-175 brand lubricant (from Rohm & Haas Co.), 0.25 pph of PVC FLEX 71–75 A 000.25% blue tint (from Reed Spectrum) and 0.2 pph of XB-2659 brand slip/antiblock agent (from Solutia Inc.). The resulting plasticized PVC was die extruded into sheets and laminated to both sides of an open polyester fabric having 0.8 threads per centimeter (2 threads per inch) having a yellow-colored, Scotchlite® brand retroreflective tape running longitudinally at the center of the fabric. The resulting flexible, transparent, tear-resistant, brattice cloth comprising vinyl coated polyester fabric met the flame resistance requirements of Part 7, Subpart D of Title 30 Code of Federal Regulations. test of 30 CFR 7.24. The sheet was retroreflective in the area of the laminated retroreflective tape. To demonstrate the optical transparancy of the mine brattice cloth a white sheet with the printed words "flame resistant" in the font and size shown in FIG. 1 was placed behind the laminated sheet; the words "flame resistant" were legible through the laminated cloth from a distance of 3 meters in front of the mine brattice cloth.

While the invention has been described in detail and with reference to specific embodiments thereof, it will be apparent to one skilled in the art that various changes and modifications can be made therein without departing from the spirit and scope thereof.

What is claimed is:

1. A flame-resistant, transparent, flexible, tear-resistant, plastic-coated sheet comprising:

(a) outer layers of transparent, flame resistant plastic sheet, and (b) at least one strip of retroreflective material between said outer layers, wherein said at least one strip is of such width, and location within said outer layers, to provide a visible reflective strip that does not mask the transparency of said outer layers.

2. The sheet according to claim 1 further comprising:
(c) an inner layer located between said outer layers, said inner layer comprising an open web reinforcing fabric that does not mask the transparency of said outer layers.

3. A sheet according to claim 2 wherein said sheet is coated with vinyl polymer.

4. A sheet according to claim 3 wherein said vinyl polymer comprises aryl phosphate plasticizer.

5. A sheet according to claim 4 wherein said plasticizer comprises t-butyl or isopropyl substituted phenyl phosphate esters.

6. A sheet according to claim 2 wherein said vinyl polymer comprises tetrahalo phthalate ester plasticizer.

7. A sheet according to claim 6 wherein said plasticizer comprises dialkyl esters of tetra bromo or tetra chloro phthalic acid.

8. A sheet according to claim 1 having flexibility such that a suspended sheet will deflect to allow pedestrian traffic to pass.

9. The sheet of claim 2 wherein said inner layer is selected from a polyester, polypropylene, fiberglass, polyamide or polyaramide scrim having an open weave design.

10. The sheet of claim 1 further utilized as mine brattice cloth.

* * * * *